United States Patent [19]

Lace

[11] Patent Number: 4,971,581

[45] Date of Patent: Nov. 20, 1990

[54] CONNECTOR GUARD FOR A TELEPHONE LINE OVERVOLTAGE PROTECTION DEVICE

[75] Inventor: Melvin A. Lace, Prospect Heights, Ill.

[73] Assignee: Oneac Corporation, Libertyville, Ill.

[21] Appl. No.: 382,840

[22] Filed: Jul. 20, 1989

[51] Int. Cl.$^5$ ............................................... H01R 9/08
[52] U.S. Cl. ..................................................... 439/625
[58] Field of Search ............................... 439/389–426, 439/625, 744–749

[56] References Cited

U.S. PATENT DOCUMENTS

| | | | |
|---|---|---|---|
| 3,611,264 | 10/1971 | Ellis, Jr. | 439/404 |
| 3,852,539 | 12/1974 | DeLuca | 179/174 |
| 3,866,996 | 2/1975 | Elkins | 439/404 |
| 3,961,227 | 6/1976 | DeLuca et al. | 317/101 R |
| 4,106,838 | 8/1978 | Jayne et al. | 439/404 |
| 4,283,103 | 8/1981 | Forberg et al. | 439/404 |
| 4,703,983 | 11/1987 | Nabell et al. | 439/92 |

Primary Examiner—Joseph H. McGlynn
Attorney, Agent, or Firm—Mason, Kolehmainen, Rathburn & Wyss

[57] ABSTRACT

A connector guard is provided for a telephone line overvoltage protection device of the type having a plurality of terminals for electrical and mechanical connection with a telephone connector block. The connector guard comprises a housing including a plurality of walls extending in an axial direction between a first end and a second end. The housing is formed of electrically insulative material. The housing walls define a plurality of terminal receiving channels that extend between the first and second ends of the housing. The terminals are slideably inserted into the channels from the first end and are retained in snap-fit engagement with the housing. The housing walls electrically insulate adjacent ones of the terminals. The connector guard channels are dimensioned to provide contact pressure on the terminals to maintain effective electrical connections. The connector guard is dimensioned to facilitate electrical testing access to the terminals.

8 Claims, 2 Drawing Sheets

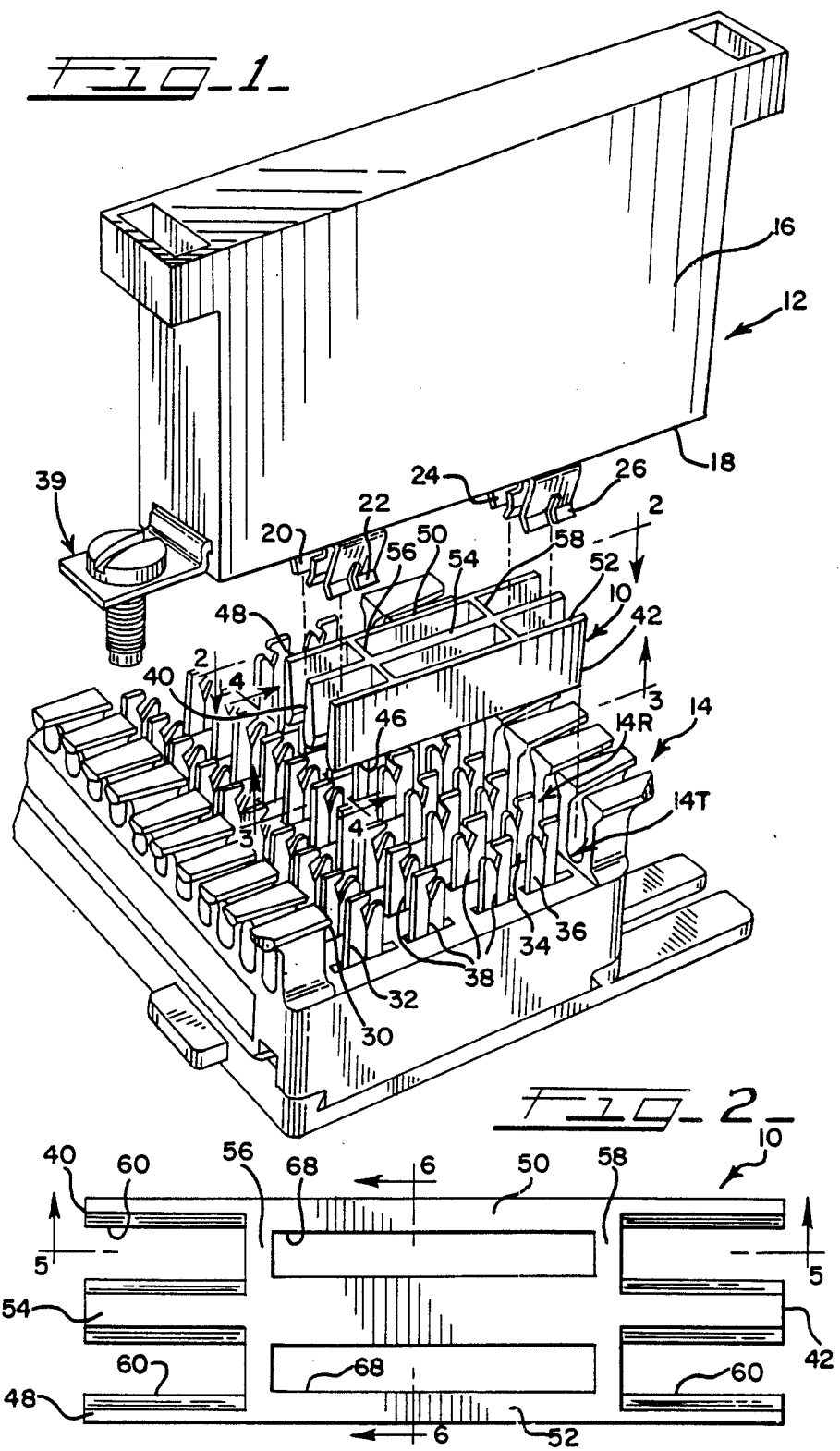

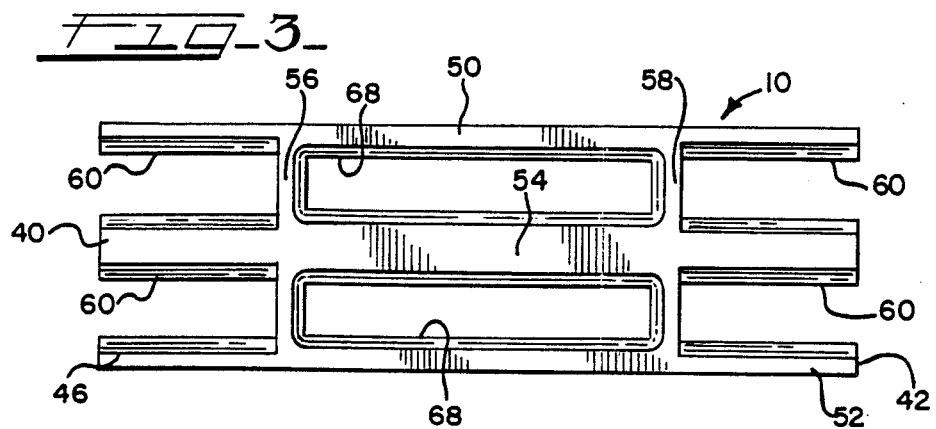
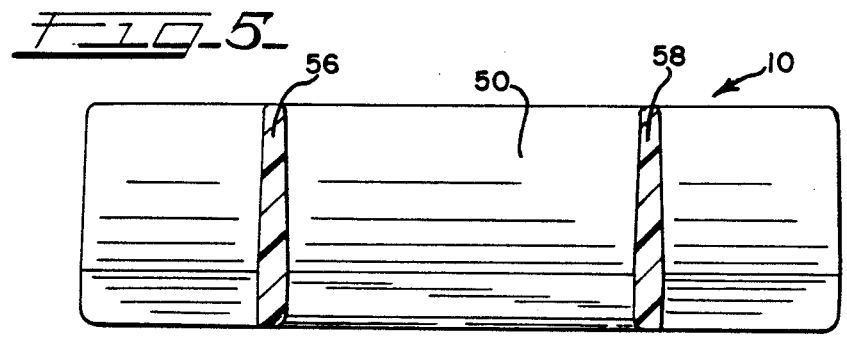
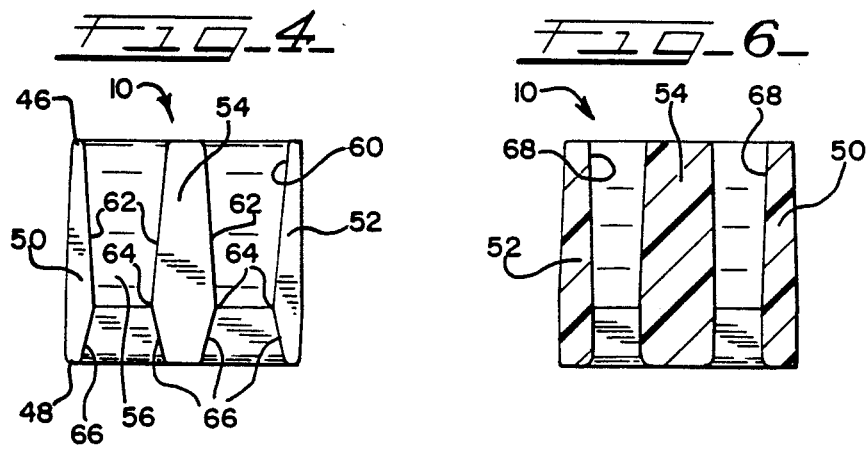

CONNECTOR GUARD FOR A TELEPHONE LINE OVERVOLTAGE PROTECTION DEVICE

BACKGROUND OF THE INVENTION

1. Field of the Invention

The present invention relates generally to telephone connector block assemblies for connecting overvoltage protection devices with subscriber telephone lines, and more particularly to a connector guard for an overvoltage protection device.

2. Description of the Prior Art

Telephone connector block assemblies are used for connecting overvoltage protection devices with telephone subscriber lines within a telephone office. In a typical assembly, multiple overvoltage protection devices are installed on a single telephone connector block in closely spaced relationship. Terminal blades are carried by the telephone connector block for engagement with the terminals of the overvoltage protection devices. Typically the terminal blades are arranged vertically in closely spaced apart rows with first and second vertical rows of terminal blades connected to the tip and ring lines of an individual telephone subscriber line. Each overvoltage protection device has corresponding terminal clips for electrical connection with the corresponding first and second vertical rows of terminal blades. In order to prevent premature failure from a faulty electrical connection, each overvoltage protection device must be installed properly to avoid misalignment. Disadvantages of known telephone connector block assemblies for connecting overvoltage protection devices with subscriber telephone lines include the difficulty and time required for assembly.

SUMMARY OF THE INVENTION

Among the principal objects of the present invention are to provide a connector guard for a telephone line overvoltage protection device; to provide a connector guard facilitating manufacture, assembly, testing and improved reliability of telephone connector block assemblies for connecting overvoltage protection devices with subscriber telephone lines; and to provide a connector guard overcoming many of the disadvantages of known telephone connector block assemblies for connecting overvoltage protection devices with telephone subscriber lines.

In brief, the objects and advantages of the present invention are achieved by a connector guard for a telephone line overvoltage protection device of the type having a plurality of terminals for electrical and mechanical connection with a telephone connector block. The connector guard comprises a housing including a plurality of walls extending in an axial direction between a first end and a second end. The housing is formed of electrically insulative material. The housing walls define a plurality of terminal receiving channels that extend between the first and second ends of the housing. The terminals are slideably inserted into the channels from the first end and the housing walls electrically insulate adjacent ones of the terminals.

BRIEF DESCRIPTION OF THE DRAWINGS

The present invention together with the above and other objects and advantages may best be understood from the following detailed description of the embodiment of the invention illustrated in the drawings, wherein:

FIG. 1 is fragmentary exploded perspective view of a telephone connector block assembly for connecting overvoltage protection devices provided with a connector guard constructed in accordance with the present invention;

FIG. 2 is an elevational view of the overvoltage protection device connector guard viewed from the line 2—2 of FIG. 1 on an enlarged scale;

FIG. 3 is an enlarged elevational view of the overvoltage protection device connector guard viewed from the line 3—3 of FIG. 1;

FIG. 4 is an enlarged elevational view of the overvoltage protection device connector guard viewed from the line 4—4 of FIG. 1;

FIG. 5 is a sectional view taken along the line 5—5 of FIG. 2 ; and

FIG. 6 is a sectional view taken along the line 6—6 of FIG. 2.

DETAILED DESCRIPTION OF THE PREFERRED EMBODIMENT

Referring now to the drawings, in FIGS. 1-6 there is illustrated a connector guard designated as a whole by the reference character 10 and constructed in accordance with principles of the present invention. In FIG. 1, there is shown an overvoltage protection device 12 used in conjunction with the connector guard 10 and a portion of a telephone connector block 14 of conventional, compact type for connecting multiple overvoltage protection devices 12 to subscriber telephone lines. Each overvoltage protection device 12 is operatively connected to the tip and ring lines of an individual telephone subscriber line (not shown) via a first vertical row 14T and a second vertical row 14R of terminal blades of the telephone connector block 14. The multiple terminal blade rows 14T and 14R are closely spaced apart and form adjacent rows to support a plurality of devices 12 in compact relation on the telephone connector block 14. The overvoltage protection device 12 includes a molded body 16 containing overvoltage protection circuitry and having a mating face 18 carrying four terminal clips 20, 22, 24, 26 adapted for electrical and mechanical engagement with corresponding terminal blades 30, 32, 34, 36 of the telephone connector block 14. A plurality of terminal blades 38 are mounted on the telephone connector block 14 between the terminal blades 30, 32, 34 and 36. A grounding connecting member 39 of the overvoltage protection device 12 is connected in a conventional manner with ground potential.

Resilient, spring clip terminals such as shown in FIG. 1 can be used for terminal clips 20, 22, 24, 26, although various different terminal types can be employed. Overvoltage protection circuitry for connection with the individual telephone subscriber lines that advantageously can be used is disclosed by U.S. Pat. No. 4,758,920 issued to Thomas McCartney and assigned to the present assignee.

Connector guard 10 provides electrical insulation between terminal clips 20, 22, 24, 26 of both each overvoltage protection device 12 and adjacent ones of the overvoltage protection devices 12. In accordance with the present invention, connector guard 10 is configured to enhance insertion alignment of the terminal clips 20, 22, 24, 26 with the corresponding pins 30, 32, 34, 36 to facilitate installation of each overvoltage protection device 12 with the telephone connector block 14. Connector guard 10 electrically insulates between adjacent terminal clips 20, 22, 24, and 26. Connector guard 10 increases contact pressure to provide and maintain an effective gastight contact between the terminal clips 20, 22, 24, 26 and the corresponding pins 30, 32, 34, 36.

Referring also to FIGS. 2 and 3, connector guard 10 extends in a longitudinal direction between a first end 40 and a second end 42. Connector guard 10 extends in an axial direction between a first filter-mating face 46 and a second opposed face 48. Preferable, connector guard 10 is a unitary member formed of strong, flexible electrically insulating material. A plastic or similar, synthetic resin material forms the connector guard 10 by conventional injection molding techniques.

Connector guard 10 includes a pair of elongated sidewalls 50, 52, an elongated central inside wall 54 and a pair of recessed end walls 56,58 defining a plurality of terminal-receiving channels 60. Terminal clips 20, 22, 24, 26 are slideably inserted into the terminal-receiving channels 60.

Referring also to FIG. 4, each of the four terminal clips 20, 22, 24, 26 is received and retained in snap-fit engagement with the connector guard 10 within channel 60. Sidewalls 50, 52 and the inside wall 54 defining each of the channels 60 include a first inwardly diverging portion 62 extending from the first filter-mating face 46 to an apex 64 for receiving and guiding the terminal clips 20, 22, 24, 26 into the channel 60. A second outwardly diverging portion 66 of the sidewalls 50, 52 and the inside wall 54 extends from the apex 64 to the opposed face 48 for receiving, positioning and retaining the terminal clips 20, 22, 24, 26 within the channel 60.

In assembled condition with the overvoltage protection device 12, with terminal clips 20, 22, 24, 26 retained in snap-fit engagement with the connector guard 10 within channels 60, the connector guard 10 is free floating longitudinally and dimensioned to facilitate slideable movement to provide access for electrical testing of either terminal clips 20 and 22 or terminal clips 24 and 26.

Referring also to FIGS. 5 and 6, connector guard 10 includes a pair of channels 68 for receiving the multiple terminal blades 38 of the connector block 14 to provide mechanical positioning or guide function. Channels 68 defined by the connector guard walls 50, 52, 54, 56 and 58 are generally centrally disposed between the opposed ends 40 and 42.

While the invention has been described with reference to details of the illustrated embodiment, these details are not intended to limit the scope of the invention as defined in the appended claims.

What is claimed is:

1. A connector guard for a telephone line overvoltage protection device of the type having a plurality of terminals, each of said terminals being adapted to be electrically and mechanically connected to one of a plurality of pins of a telephone connector block, said connector guard comprising:

a housing formed of an electrically insulated material and having a first mating face adapted to be positioned adjacent said connector block and an opposed second face, said first and second faces forming exterior surfaces of a plurality of elongated housing walls extending between a first end and a second end of said housing; and a plurality of terminal receiving channels formed by said elongated housing walls, each of said channels extends between said first mating face and said second face of said housing, is disposed adjacent to one of said first and second ends of said housing, and is adapted to receive through said first mating face one of said pins and to receive through said second face one of said terminals such that when said connector guard is positioned relative to said connector block and when said one terminal is positioned within one of said channels in engagement with said one pin said connector guard electrically insulates adjacent ones of said terminals and pins.

2. A connector guard as recited in claim 1 wherein the terminals are received and retained within said channels in snap-fit engagement with said housing.

3. A connector guard as recited in claim 1 wherein said housing is a unitary member formed by injection molding technique.

4. A connector guard as recited in claim 1 wherein said housing is formed of a synthetic resin material.

5. A connector guard as recited in claim 1 wherein each of said terminal receiving channels have an open side at the end of said housing at which the channel is adjacent such that said housing is longitudinally moveable to provide testing access to the terminals positioned in said channels.

6. A connector guard as recited in claim 1 wherein said housing walls defining said plurality of terminal receiving channels are dimensioned to provide contact pressure on the terminals received within said housing channels.

7. A connector guard for a telephone line overvoltage protection device of the type having a plurality of clip-type terminals, each of said terminals being adapted to be electrically and mechanically connected to one of a plurality of contacts extending from a telephone connector block, said connector guard comprising:

a housing formed of an electrically insulated material and having a first face adapted to be positioned adjacent said connector block and an opposed second face, said first and second faces forming exterior surfaces of a plurality of elongated housing walls extending between a first end and a second end of said housing; and a plurality of terminal receiving channels formed by said elongated housing walls, each of said channels extends between said first mating face and said second face of said housing, has opposed channel walls which coverage toward each other as said channel walls extend from said second face toward a plane spaced from said first wall, is disposed adjacent to one of said first and second ends of said housing, and is adapted to slidably receive through said first mating face one of said contacts and is adapted to receive through said second face one of said terminals such that said clip-type terminal will engage said converging opposed channel walls and said clip-type terminal will be in snap-fit engagement in said channel whereby said connector guard will electrically insulate adjacent ones of said terminals and contacts when said connector guard is positioned relative to said connector block.

8. A connector guard for a telephone line overvoltage protection device of the type having a plurality of terminals, each of said terminals being adapted to be electrically and mechanically connected to one of a plurality of pins of a telephone connector block, said connector guard comprising:

a housing formed of an electrically insulated material and having a first mating face adapted to be positioned adjacent said connector block and an opposed second face, said first and second face forming exterior surfaces of a plurality of elongated housing walls extending between a first end and a second end of said housing;

a plurality of terminal receiving channels formed by said elongated housing walls, each of said channels extends between said first mating face and said second face of said housing, is disposed adjacent to one of said first and second ends of said housing, and is adapted to receive through said first mating face one of said pins and to receive through said second face one of said terminals such that when said connector guard is positioned relative to said connector block and when said one terminal is positioned within one of said channels in engagement with said one pin said connector guard electrically insulates adjacent ones of said terminals and pins; and at least one of said channels is positioned adjacent said first end and has two first opposed channel side walls and a first connecting end wall extending between said first opposed channel side walls with the side opposite to said first connecting wall being opened to said first end of said housing and at least another of said channels is positioned adjacent said second end and has two second opposed channel side walls and a second connecting end wall extending between said second opposed channel side walls with the side opposite to said second connecting wall being opened to said second end of said housing so that when said housing is positioned relative to said connecting block with at least one of said terminals received in said one channel and at least another of said terminals received in said another channel said housing is moveable with respect to said connector block to provide testing access to said terminals.

* * * * *